United States Patent
Lipan et al.

(10) Patent No.: US 10,381,836 B2
(45) Date of Patent: Aug. 13, 2019

(54) POWER CONVERTER COMMUNICATIONS

(71) Applicant: Solantro Semiconductor Corp., Ottawa (CA)

(72) Inventors: Tudor Lipan, Ottawa (CA); James Benson Bacque, Ottawa (CA); Raymond Kenneth Orr, Kanata (CA)

(73) Assignee: SOLANTRO SEMICONDUCTOR CORP., Ottawa (CA)

( * ) Notice: Subject to any disclaimer, the term of this patent is extended or adjusted under 35 U.S.C. 154(b) by 1048 days.

(21) Appl. No.: 14/570,540

(22) Filed: Dec. 15, 2014

(65) Prior Publication Data

US 2016/0172860 A1 Jun. 16, 2016

(51) Int. Cl.
*H02J 3/38* (2006.01)
*H02J 13/00* (2006.01)
(Continued)

(52) U.S. Cl.
CPC .......... *H02J 3/383* (2013.01); *H02J 13/0006* (2013.01); *H04B 3/542* (2013.01); *H02J 1/00* (2013.01); *H02J 13/0062* (2013.01); *H02J 13/0075* (2013.01); *H02M 1/14* (2013.01); *H02M 3/158* (2013.01); *H04B 2203/547* (2013.01); *H04B 2203/5445* (2013.01); *Y02B 90/2638* (2013.01); *Y02B 90/2653* (2013.01); *Y02B 90/2692* (2013.01); *Y02E 10/563* (2013.01); *Y02E 40/72* (2013.01); *Y04S 10/123* (2013.01); *Y04S 40/124* (2013.01); *Y04S 40/126* (2013.01); *Y04S 40/146* (2013.01)

(58) Field of Classification Search
CPC ............ Y02B 90/2638; Y02B 90/2653; Y02B 90/2692; Y02E 10/563; Y02E 40/72; Y04S 10/123; Y04S 40/124; Y04S 40/126; Y04S 40/146
See application file for complete search history.

(56) References Cited

U.S. PATENT DOCUMENTS

2006/0291541 A1* 12/2006 Durand ................ H04B 1/7075
375/147
2010/0277002 A1 11/2010 Folts et al.
(Continued)

OTHER PUBLICATIONS

International Written Opinion dated Feb. 9, 2016 in respect of International PCT Patent Application No. PCT/CA2015/051306 (4 pages).
(Continued)

*Primary Examiner* — Jared Fureman
*Assistant Examiner* — Aqeel H Bukhari
(74) *Attorney, Agent, or Firm* — Barnes & Thornburg LLP

(57) ABSTRACT

Power converter communications, including power converter communication methods and power converters that can communicate information, are disclosed. A control variable of a power converter is modulated, to modulate an output of the power converter for communicating information. Modulation of voltage or current on a circuit path to which the power converter is coupled could be detected, by another power converter, for example. Such modulation could be detected by sensors that are also used in controlling the power converter. Either or both of transmission and reception could therefore be provided without requiring any additional hardware at a power converter.

23 Claims, 10 Drawing Sheets

(51) Int. Cl.
  *H04B 3/54* (2006.01)
  *H02J 1/00* (2006.01)
  *H02M 1/14* (2006.01)
  *H02M 3/158* (2006.01)

(56) References Cited

U.S. PATENT DOCUMENTS

| | | | |
|---|---|---|---|
| 2012/0091817 A1* | 4/2012 | Seymour | H02J 3/383 307/82 |
| 2012/0223583 A1 | 9/2012 | Cooley et al. | |
| 2014/0054969 A1* | 2/2014 | Beijer | G05F 1/67 307/78 |
| 2015/0160676 A1* | 6/2015 | Pan | G05F 1/67 307/82 |
| 2016/0359332 A1* | 12/2016 | Deboy | H02J 3/383 |

OTHER PUBLICATIONS

International Search Report dated Feb. 9, 2016 in respect of International PCT Patent Application No. PCT/CA2015/051306 (3 pages).

* cited by examiner

POWER CONVERTER COMMUNICATIONS

TECHNICAL FIELD

The embodiments herein generally relate to the field of communications and particularly to communications to or from switching mode power converters.

BACKGROUND

PhotoVoltaic (PV) solar panels are an important source of power for the electrical grid. Large, megawatt PV installations with PV panels numbering in the tens of thousands are increasingly common. PV panel arrays are typically organized into panel "strings" with each string consisting of from 10 to 20 PV panels connected in series. In a Direct Current (DC) PV panel system, the output of a PV panel string could connect to a central inverter which converts the DC power of the PV panels into Alternating Current (AC) power suitable for the electrical grid.

A known problem of connecting PV panels in series is the differing Maximum Power Point (MPP) currents produced by individual PV panels. The MPP current of a panel ($I_{MPP}$) is the current corresponding to the panel's maximum power production for a specific level of insolation. A PV panel also has a corresponding MPP voltage. MPP current differences between panels may be caused by one or more of: shading of a particular PV panel, soiling of a PV panel, differences in PV panel orientation, temperature differences or PV panel manufacturing variations. Since all PV panels in a string are series-connected, they must all necessarily be operating at the same current-level. If the panels in a string all have differing MPP currents then it is likely that most of them will not operate at their maximum power points when series connected.

A common solution to the problem of unequal photocurrents is to add DC converters to the output of each PV panel. A DC converter converts power at one DC voltage and current to power at another DC voltage and current. The addition of a DC converter to a panel decouples the panel's output current from the string current. It allows the panel to operate at its own MPP current. For example, for a panel with an MPP current lower than the string current a DC converter could convert power from that lower MPP current (and higher voltage) to the higher string current value (and a lower voltage). A DC converter could thus maximize the power output of a PV panel by allowing it to operate at its MPP independent of string current.

SUMMARY

A power converter communication method involves modulating a control variable of the power converter, to modulate an output of the power converter to communicate information.

The modulating could involve modulating the control variable to assume any of at least a first value and a second value during communications.

In an embodiment, the modulating involves modulating the control variable to assume binary values of either a first binary value or a second binary value during communications. The first binary value and the second binary value could have a median value that is set to a value of the control variable immediately preceding communications.

The control variable could be a duty cycle D of switching in the power converter.

The modulating could involve modulating the control variable to produce binary values $V_1$, $V_0$ of power converter output voltage or binary values $I_1$, $I_0$ of power converter output current during communications, in accordance with a closed loop control method.

In an embodiment in which the modulating involves modulating the control variable to produce binary values $V_1$, $V_0$, of power converter output voltage, a mid-point voltage $(V_1+V_0)/2$ could be set to an average value of the power converter output voltage immediately preceding communications.

In another embodiment in which the modulating involves modulating the control variable to produce binary values $V_1$, $V_0$ of power converter output voltage, the control variable is a duty cycle D of switching in the power converter, and a higher of the binary values $V_1$, $V_0$ of power converter output voltage is set to correspond a duty cycle D of 100%.

The power converter could be controlled in accordance with an MPP control loop to maintain a PV panel that is coupled to the power converter at its MPP. The modulating could then involve modulating the control variable during communications at a modulation frequency greater than a bandwidth of the MPP control loop. In another embodiment, the method involves suspending the MPP control loop during communications.

The modulating could involve modulating the control variable to produce changes in power converter output voltage or current. The method could also involve detecting changes in voltage at a component that is operatively coupled to the power converter, or detecting changes in current at a component that is operatively coupled to the power converter.

In an embodiment, the modulating involves modulating the control variable during communications at a modulation frequency below a corner frequency of EMI (Electro Magnetic Interference) filtering applied to an output of the power converter.

The modulating could also or instead involve modulating the control variable during communications at a modulation frequency below a switching frequency of the power converter.

The modulating could involve modulating the control variable in accordance with a Direct Sequence Spread Spectrum (DSSS) communication method employing Barker encoding. The Barker encoding could include codes with unequal numbers of chip values for "1" and "0", in which case the modulating could also involve selecting respective values of power converter output voltage to transmit a chip "1" and a chip "0" based on a ratio of chip values "1" to chip values "0" in a code to be transmitted.

The power converter could be a DC power converter.

In another embodiment, the power converter is a DC/AC power converter.

Such a method could be implemented in a power system that includes power converters coupled in a circuit path with a communication gateway. The method could include, at each of the power converters, the modulating. The method could also include, at the communication gateway: detecting changes in voltage or current on the circuit path; demodulating the information communicated by the power converters based on the detected changes.

In another embodiment, such a method is implemented in a power system that includes power converters coupled in a circuit path, and the method involves, at each of the power converters: the modulating; detecting changes in voltage or current on the circuit path; demodulating the information communicated by other power converters based on the detected changes.

There is also provided a method including: detecting, by a sensor of a power converter, modulation of voltage or current on a circuit path that is coupled to the power converter; demodulating, by a controller of the power converter, information from the circuit path voltage or current based on the detected modulation.

A power converter includes: controllable switch elements; a controller, coupled to the controllable switch elements, to control switching of the controllable switch elements in accordance with a control variable of the power converter; and to modulate the control variable during communications to modulate an output of the power converter to communicate information.

In another embodiment a power converter includes: a sensor to sense voltage or current on a circuit path to which the power converter is coupled; a controller, coupled to the sensor, to control operation of the power converter based on the sensed voltage or current, to detect modulation of voltage or current on the circuit path, and to demodulate information from the circuit path voltage or current based on the detected modulation.

BRIEF DESCRIPTION OF THE DRAWINGS

The embodiments herein will be better understood from the following detailed description with reference to the drawings, in which.

DETAILED DESCRIPTION

Remote communications with the DC converters in a PV string could be desirable. For example, a DC converter could measure the operational parameters of its PV panel or its own operational parameters such as, for example, PV panel output voltage, PV panel output current, DC converter output power, PV Panel temperature, and/or DC converter operating temperature. These operational parameters could have beneficial diagnostic value. For example, they could identify failing or sub-performing PV panels or DC converters, set a schedule for panel cleaning or identify panels eligible for a warranty claim. They might also be beneficial in the diagnosis of arc faults occurring in the PV array. For example, a parallel arc fault could be diagnosed by comparing the output current or power of individual DC converters in the same string. U.S. patent application Ser. No. 14/316,477, filed on Jun. 26, 2014 and entitled "ARC FAULT DETECTION AND EXTINGUISHING", discloses detection of parallel arc faults, for example. Communications to remotely shut down the DC converters in a PV string for servicing or to download firmware updates could also be a desirable feature.

Various methods to communicate with a DC converter in a PV string are possible and could include, for example, wireless transmitters or power line communication methods communicating over the PV panel system's power lines. These methods require the addition of dedicated communications hardware to the DC converter and could result in undesirable additional cost and complexity. It may therefore be desirable to have a DC converter communication method which requires no additional DC converter hardware or dedicated communication wiring and uses only the existing hardware and capabilities of the PV panel's DC converter.

Figure 1A:
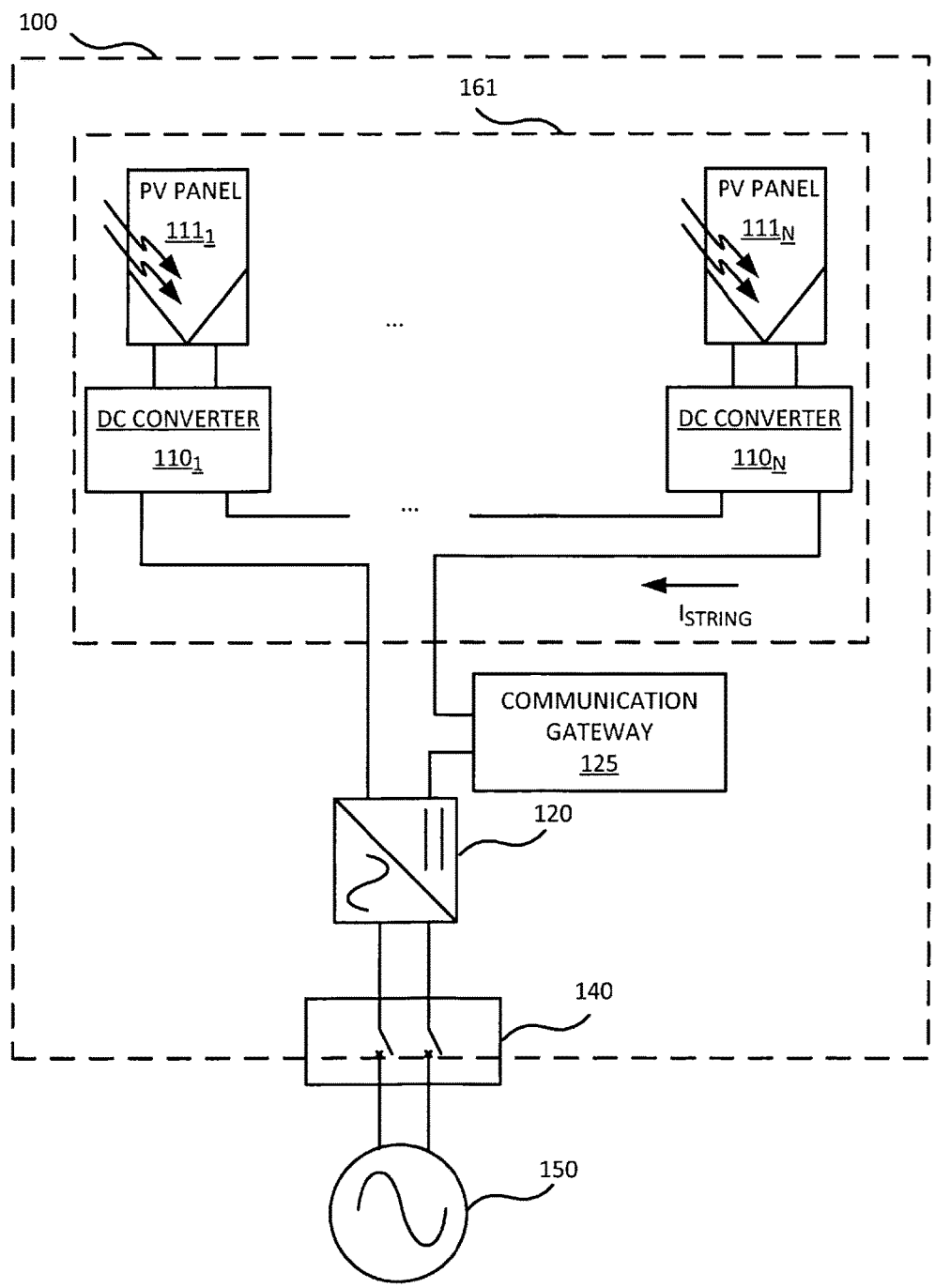
FIG. 1A is a block diagram of an example PV power system.

FIG. 1A is a block diagram of an example PV power system. System 100 comprises PV panel string 161, string inverter 120, communication gateway 125 and grid disconnect switch 140. System 100 connects to electrical grid 150 at the output of grid disconnect switch 140. In one embodiment electrical grid 150 has a grid frequency of 60 Hz and a Root Mean Square (RMS) grid voltage of 240V. String 161 comprises PV panels $111_1 \ldots 111_N$ and DC converters $110_1 \ldots 110_N$. The inputs of DC converters $110_1 \ldots 110_N$ couple to PV panels $111_1 \ldots 111_N$. The outputs of DC converters $110_1 \ldots 110_N$ are serially connected to the input of string inverter 120. Communication gateway 125 is serially connected to DC converters $110_1 \ldots 110_N$ and inverter 120. Thus, the outputs of the DC converters $110_1 \ldots 110_N$ are serially coupled together in a circuit path with the communication gateway 125, between input terminals of the inverter 120.

Communication gateway 125 receives communication signals from DC converters $110_1 \ldots 110_N$. In some embodiments communication gateway 125 also transmits communication signals to DC converters $110_1 \ldots 110_N$. In some embodiments communication gateway 125 communicates with a monitoring station (not shown). Any of various options could be used by the communication gateway for communicating with other components. The techniques disclosed herein could be used between the communication gateway 125 and the DC converters $110_1 \ldots 110_N$ in FIG. 1. The communication gateway 125 could include additional communication circuitry for communications with other components, through wired or wireless communication links. DC converters $110_1 \ldots 110_N$ could also communicate with one another.

FIG. 1A is an example only. In other embodiments multiple PV panel strings are parallel connected across the input of a string inverter.

Figure 2A:
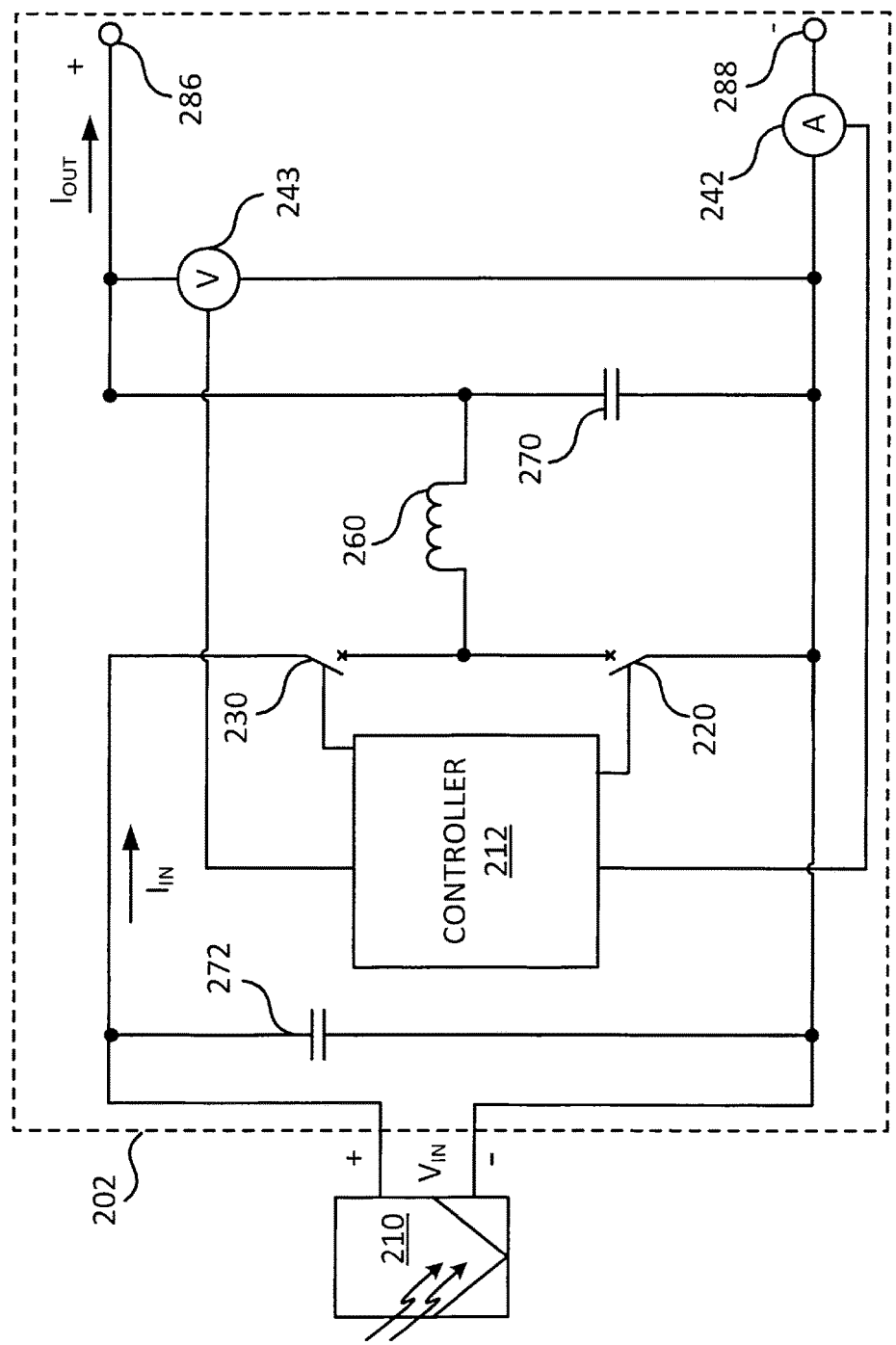
FIG. 2A is a schematic diagram of an example DC converter.

FIG. 2A is a schematic diagram of an example DC converter, which could be implemented as the DC converters $110_1 \ldots 110_N$ in FIG. 1A. The example DC converter 202 is a switching mode DC converter, and comprises controller 212, switches 230 and 220, inductance 260, output capacitance 270, input capacitance 272, voltage sensor 243, current sensor 242 and output terminal pair 286, 288. DC converter 202 is coupled to PV panel 210 at its input. Output terminal pair 286, 288 could serially connect DC converter 202 to additional DC converters in a PV panel string (not shown). Switches 230, 220 could be semiconductor switches such as, for example, Power Metal Oxide Semiconductor Transistors (MOSFETs), bipolar junction transistors or thyristors. Switches 230, 220 could also be electromechanical switches such as for example, relays. These are all examples of switching elements that could be used in implementing a power converter.

In one embodiment PV panel 210 is a 250 W panel, input capacitance 272 is 60 uF and output capacitance 270 is 10 uF and switches 220, 230 are power MOSFETs. Converter 202 is an example only and other circuit configurations are possible.

Converter 202 is a synchronous "buck" type switching mode DC converter and converts a DC input voltage at one level to a DC output voltage at an equal or lower level by the coordinated switching of switches 230, 220. Other types of switching mode DC converter topologies are possible including, for example, an asynchronous buck converter, a boost converter, a buck-boost converter, a flyback converter or a Dual Active Bridge converter. The communication method described below is applicable to these and other power-conversion topologies and control modes.

The operation of converter 202 is controlled by controller 212. Controller 212 could be implemented using hardware, firmware, or one or more elements that execute software. Electronic devices that might be suitable for implementing controller 230 include, among others, microprocessors, microcontrollers, Programmable Logic Devices (PLDs), Field Programmable Gate Arrays (FPGAs), Application Specific Integrated Circuits (ASICs), and other types of "intelligent" integrated circuits. Controller 212 could comprise memory for storage of software or firmware. The memory could include embedded memory or one or more physical memory devices, including any of various types of solid-state memory devices and/or memory devices with movable or even removable storage media. Although controller 212 is shown as a single block it could be physically distributed into separate physical components which could, for example, be in separate voltage domains.

Controller 212 generates control signals for the switching of switches 230, 220 and receives measurements from voltage sensor 243 and current sensor 242. In a DC conversion operation, switches 230 and 220 are switched by controller 212 with a switching frequency "F" and are operated in a complementary fashion, such that when one switch is open (OFF) the other switch will be closed (ON). In one embodiment F is 200 kHz. When switch 230 is closed and switch 220 is open, current from PV panel 210 flows into inductance 260, storing energy in it. When switch 230 is opened and switch 220 is closed, the voltage across the inductance 260 reverses and the inductance sources current into output capacitance 270 and output terminal 286. The duty cycle "D" of converter 202 is defined as the ratio of the ON time of switch 230 to the switching period T and is normally expressed as a percentage. The duty cycle may range from 0 to 100%. For example, if switch 230 is ON for 70% of the switching period then the duty cycle is 70%.

In one embodiment a nine bit Pulse Width Modulation (PWM) signal is used to control the duty cycle. In this embodiment the ON time of switches 220, 230 can be adjusted in time increments of $1/2^9$ (1/512) of the switching period. For example, if a switching frequency of 200 kHz is used the switching period is 5 microseconds (uS) and the ON time of switches 220, 230 can be adjusted in increments of 5 uS/512 or approximately 10 nS. Equivalently the duty cycle can be adjusted in increments of 100%/512 or ~0.2%.

The relationship of the output voltage ($V_{OUT}$) of DC converter 202 across its output terminals 286, 288 to its input voltage ($V_{IN}$) depends on its duty (D) and is given by the equation:

$$V_{OUT} = D \times V_{IN}$$

$V_{OUT}$ is defined as the voltage across output terminal pair 286, 288 and $V_{IN}$ is defined as the voltage across PV panel 210.

The relationship of the output current ($I_{OUT}$) of DC converter 202 to its input current ($I_{IN}$) also depends on the duty cycle and is given by the equation:

$$I_{OUT} = I_{IN}/D$$

Controller 212 could operate DC converter 202 to maintain PV panel 211 at its Maximum Power Point (MPP). The MPP of the panel 211 is the combination of its output voltage and current that results in the maximum output power. Controller 212 could also operate DC converter 202 such that its output current matches the string current. String current flows into terminal 288 and out of terminal 286.

Referring to FIG. 1A, the string current $I_{STRING}$ flowing in string 161 will be set by the input impedance of string inverter 120. Individual DC converters $110_1 \ldots 110_N$ could control the output current of their respective PV panels $111_1 \ldots 111_N$ to be the MPP current $I_{MPP}$ of their PV panels, in an embodiment. Individual DC converters $110_1 \ldots 110_N$ could also control the value of their output current to match the string current $I_{STRING}$. The string current and the panel MPP current would then determine the duty cycle of the DC converters $110_1 \ldots 110_N$ according to the formula:

$$D = \frac{I_{MPP}}{I_{STRING}} \qquad (1)$$

Under these conditions the input voltages to DC converters $110_1 \ldots 110_N$ would be the MPP voltages of their respective PV panels $111_1 \ldots 111_N$. The output voltage ($V_{OUT}$) of DC converter 202 will therefore be $$V^{OUT} = D \times V^{MPP} \qquad (2)$$

Where $V_{MPP}$ is the MPP voltage of a PV panel. Thus DC converters $110_1 \ldots 110_N$ could both match their output current to the string current and maintain their PV panel $111_1 \ldots 111_N$ at their maximum power points by appropriately adjusting their individual duty cycles.

The general principles outlined in the above discussion apply to various types of switching mode power converter. Their output current and voltage are controlled by a control variable. For example, the output current and voltage of a boost converter, a buck-boost converter or a forward converter are controlled by its switching duty cycle. The output current and voltage of an LLC power converter are controlled by its switching frequency. The output current and voltage of a Dual Active Bridge are controlled by the phase difference between switching waveforms of the input and output stages. Duty cycle, switching frequency, and phase difference are all examples of a power converter control variable.

The control variable of a switching mode DC converter could be beneficially used for communication purposes. A switching mode DC converter could communicate by modulating its output voltage and/or its output current by modulating its control variable. In a more general sense, a power converter communication method could involve determining information that is to be communicated, and modulating a control variable of the power converter based on the information, to modulate an output of the power converter. This could reduce or eliminate the need for any other dedicated communications and/or control hardware and so reduce the cost and complexity of implementing a DC converter with communications.

As an example, during communications the duty cycle of DC converter 202 could depart from the value as determined by power conversion considerations such as maintaining PV panel 210 at its MPP point and could be modulated to produce a modulated output current and voltage.

In one embodiment, communication is digital and during communications the control variable is modulated to assume binary values of either a first binary value or a second, different, binary value. In an embodiment, the control variable is the duty cycle of switching in the power converter. During communications the duty cycle is controlled to assume binary values of either $D_1$ or $D_0$, and has median value of $D_M$.

In another embodiment a bipolar encoding scheme such as for example, Alternate Mark Inversion is used and during communications the control variable is modulated to assume one of three different values. Thus, it should be appreciated that binary value modulation is an illustrative example. The control variable could be modulated to assume any of two, or more than two, different values during communications.

In one embodiment $D_M$, or more generally the median value of the control variable, is set to the value of the control variable immediately preceding communications.

In another embodiment and referring to FIG. 1A, $D_M$ of each DC converter $110_1 \ldots 110_N$ is set to the value which operates respective PV panel $111_1 \ldots 111_N$ at its MPP. This could reduce the amount of power lost during communications from a communicating DC converter $110_1 \ldots 110_N$ not operating its PV panel $111_1 \ldots 111_N$ at the panel's MPP.

In one embodiment referring to DC converter 202 of FIG. 2A, the duty cycle is modulated by +/−10% around a median value of 90%.

In another embodiment information is communicated digitally and during communications the output voltage of a DC converter assumes binary values of $V_1$ or $V_0$ and the output current assumes binary values of $I_1$ or $I_0$.

In another embodiment a bipolar encoding scheme such as for example, Alternate Mark Inversion is used and during communications the output voltage of a DC converter assumes values of $V_+$, $V_-$ or $V_0$ and the output current assumes binary values of $I_+$, $I_-$ or $I_0$. As noted above for control variable modulation, power converter output voltage and power converter output current could assume any of two, or more than two, different values during communications.

In another embodiment the modulation frequency of the DC converter's output is substantially less than the switching frequency of the DC converter. This could improve the bit error rate by preventing the creation of artifacts from interaction between the modulation frequency and the switching frequency. In one embodiment the switching frequency is 150 kHz and the modulation frequency is 32 kHz.

Figure 1B:
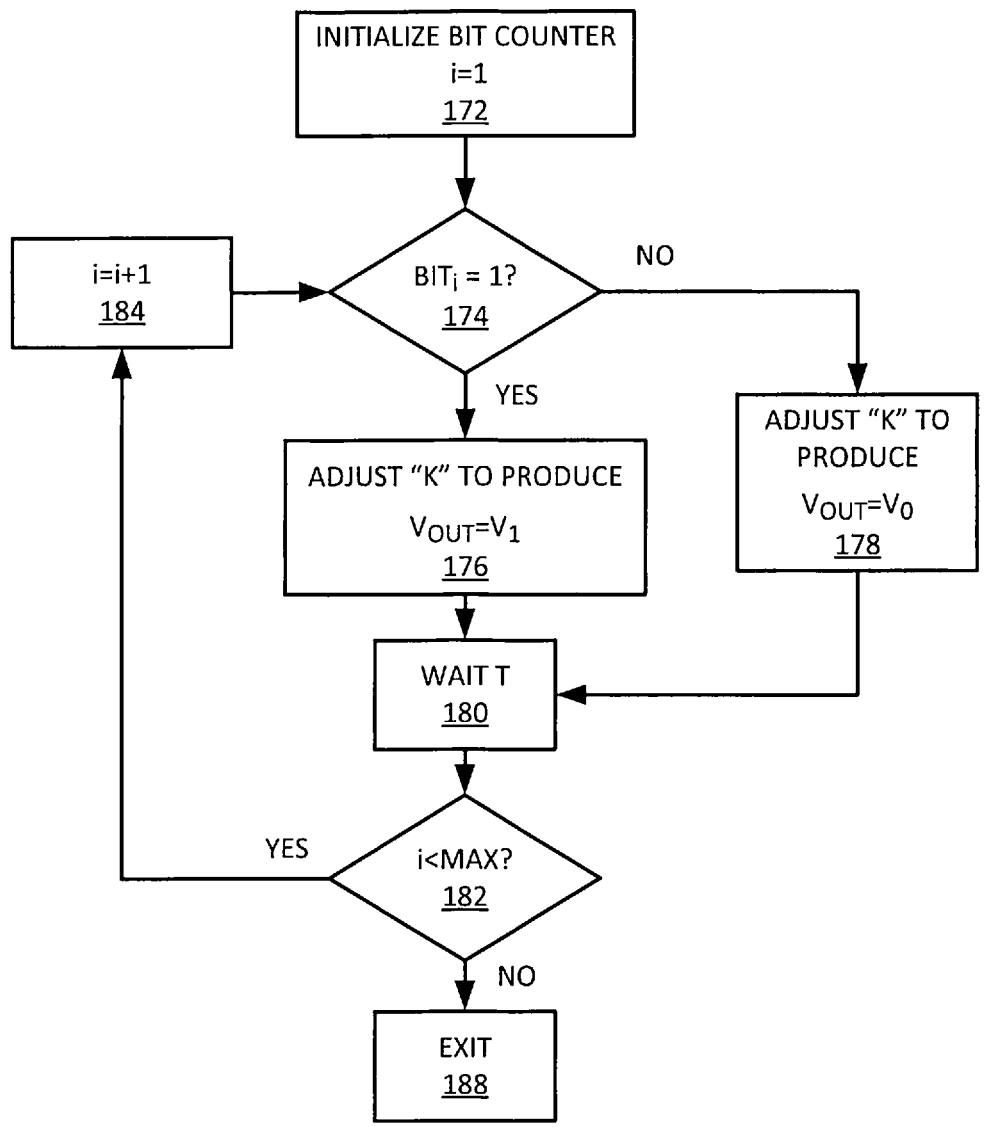
FIG. 1B is a flow diagram of an example power converter communication method.

FIG. 1B is a flow diagram of an example power converter communication method. The information to be transmitted by a power converter could include, for example, any one or more of: voltage of a power supply to which a power converter is coupled, power supply current, PV panel temperature, a PV panel identifier, a power converter identifier, a calculated value, a command or an instruction etc., and could be stored in a memory from which it is fetched. A power converter, or a component thereof such as its controller, determines the information that is to be transmitted, by for example, accessing a memory, taking a measurement or making a calculation. The transmitted information could be an exact version of original information, or it could be an encoded version of the original information. Various encoding schemes are possible including for example, Manchester encoding, differential Manchester encoding, bipolar encoding or Barker encoding.

At 172 a bit counter "i" is initialized to one. The value of the first bit ($BIT_1$) is evaluated at 174. If the value of the bit is a "1" (YES at 174) then the control variable "K" of the power converter is adjusted to produce an output voltage ($V_{OUT}$) of $V_1$ at 176. If the value of the bit is a "0" (NO at 174) the control variable "K" is adjusted to produce an output voltage of $V_0$ at 178. The output voltage remains at $V_1$ or $V_0$ for a time "T" at 180 where T is the period of the modulation frequency in one embodiment. The adjustment at 176, 178 modulates the control variable. At 182 it is determined if the bit count is less than the number of bits to be transmitted (MAX). If the bit count is less than the number of bits to be transmitted (YES at 182) then the bit counter is incremented 184 and the next bit is evaluated at 174. If the bit counter is not less than the maximum number of transmitted bits (NO at 182) then the method ends at 188, until more information is to be transmitted.

The control variable could be modulated to produce the desired values of $V_1$, $V_0$, $I_1$, $I_0$ using a closed loop control method. In other words, the control variable could be modulated to produce binary values $V_1$, $V_0$ of power converter output voltage or binary values $I_1$, $I_0$ of power converter output current during communications, in accordance with a closed loop control method.

Figure 1C:
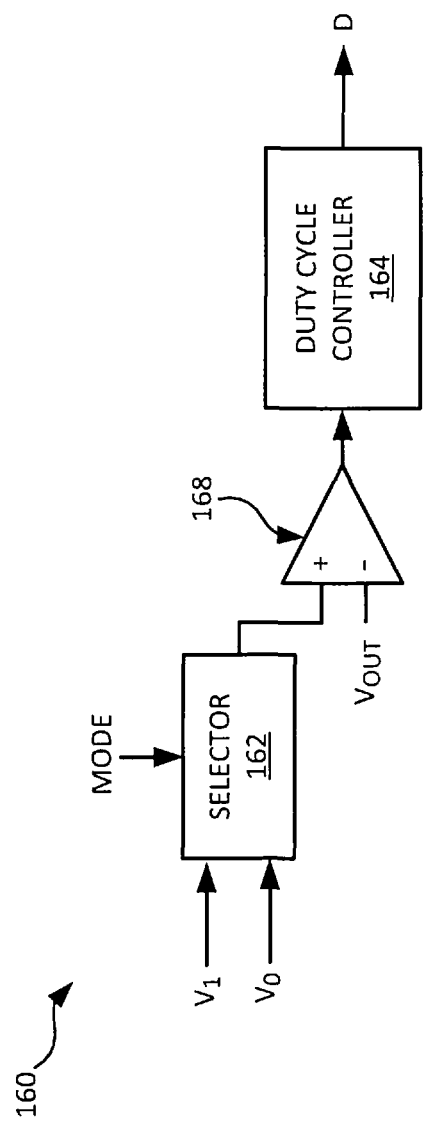
FIG. 1C is a schematic diagram of an example closed loop output voltage control system.

FIG. 1C is a schematic diagram of an example closed loop output voltage control system, which could be implemented in the controller 212 (FIG. 2B) for example. Voltage communication control system 160 comprises selector 162, difference amplifier 168 and duty cycle controller 164. Selector 162 selects between reference voltages $V_1$ and $V_0$ based on the value of a MODE signal. $V_1$ could represent the desired output voltage level corresponding to a logic "1" and $V_0$ could represent the desired output voltage corresponding to a logic "0", and the MODE signal could determine whether a logic "1" or a logic "0" is to be transmitted. The selected reference voltage ($V_1$ or $V_0$) is input into difference amplifier 168 along with the output voltage of the DC converter ($V_{OUT}$). The $V_{OUT}$ input to difference amplifier 168 closes the control loop in the example control system 160. The difference between $V_{OUT}$ and the selected reference is input into duty cycle controller 164 which produces a duty cycle signal of value "D". Duty cycle controller 164 could be a PID (Proportional Integral Differential) controller, for example. The communication mid-point voltage ($V_1+V_0$)/2 could be set to the average value of the DC converter's output voltage immediately preceding communications, in an embodiment. The communication midpoint voltage could also be set to the value which operates a converter's respective PV panel 210 (FIG. 2A) at its MPP. This could decrease the amount of power lost during communications from the DC converter not operating at its MPP.

In another embodiment, the higher of reference voltages $V_1$, $V_0$ could be set such that it corresponds to a DC converter duty cycle of 100%. This could increase the communication signal "strength" by maximizing the dynamic range of the signal. The exact values of $V_1$ and $V_0$ depend on the noise in the string and the desired communication speed and acceptable bit error rates. In one embodiment the duty cycle is modulated to produced a 2.5% output voltage modulation.

Other closed loop control methods are also possible, based on for example, the output current. In another embodiment the duty cycle could be modulated to produce desired values of $I_1$ and $I_0$ using a closed loop control method similar to the above described voltage control method. In this embodiment the communication mid-point current $(I_1+I_0)/2$ could be set to the average value of the DC converter's output current immediately preceding communications. This could decrease the amount of power lost during communications from the DC converter not operating at its MPP. In one embodiment the string current is modulated by +/−300 mA around a median string current of 8 A.

In another embodiment, output current and voltage are controlled to produce a waveform that is matched to the average or instantaneous communications-channel response characteristic to produce a waveform of known shape at the intended receiver. In traditional wire-based communications schemes this is known as "pre-compensation". Response characteristics could be determined based on known line response characteristics between DC converters $110_1 \ldots 110_N$ and the communication gateway 125 in FIG. 1A, for example.

To prevent the MPP control function of a DC converter in a PV string from interfering with modulation of the DC converter's control variable during communications, the modulation frequency of the control variable could be selected to be much greater than the bandwidth of the MPP control loop. Thus, in an embodiment in which a power converter is controlled in accordance with an MPP control loop to maintain a PV panel that is coupled to the power converter at its MPP, control variable modulation could involve modulating the control variable during communications at a modulation frequency greater than a bandwidth of the MPP control loop. In one embodiment the MPP control loop has a control bandwidth of 1 Hz and the modulation frequency during communications is 6.4 kHz. In another embodiment the MPP control loop is suspended during communications.

Figure 2B:
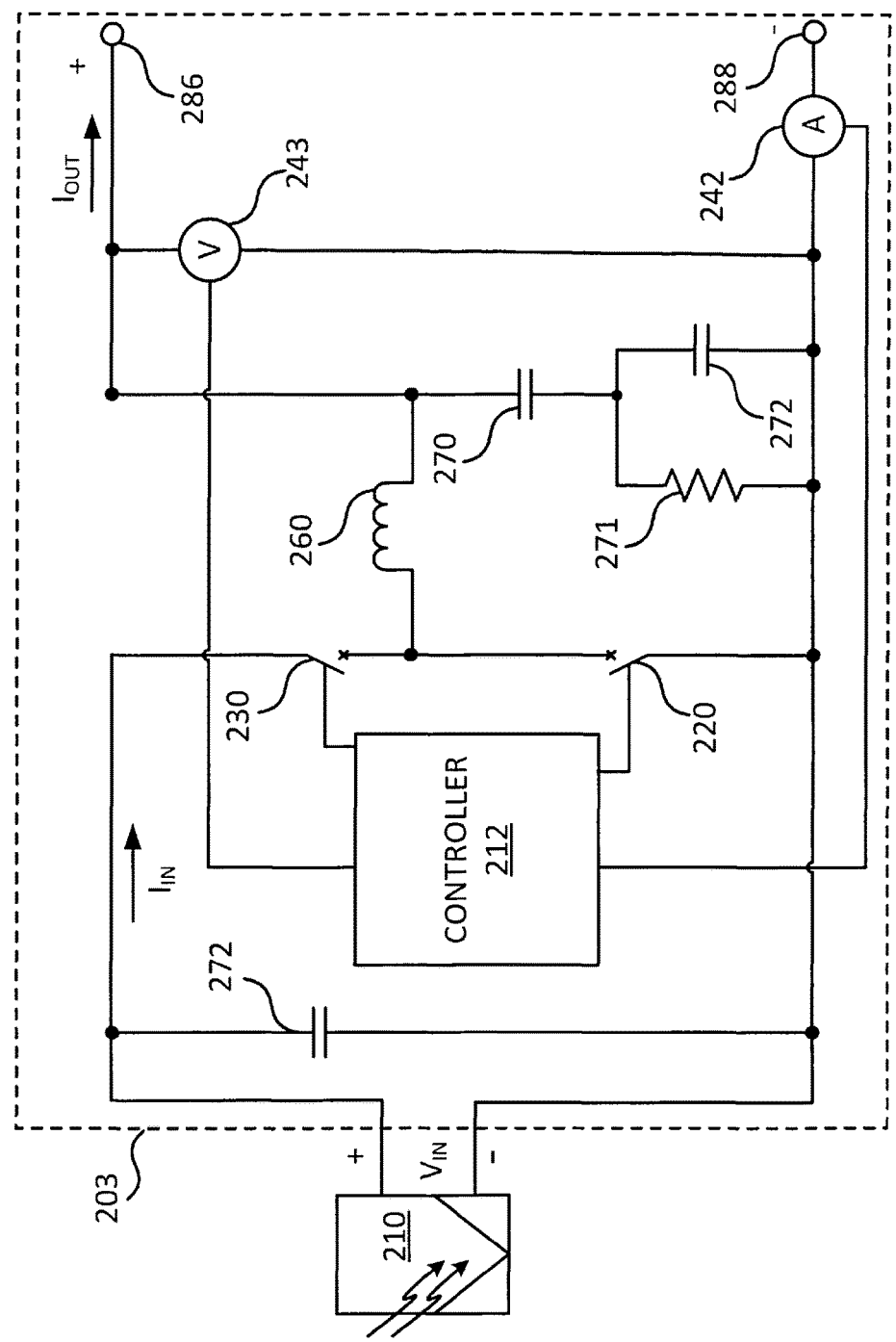
FIG. 2B is a schematic diagram of an example modified DC converter with a dampened output resonance.

DC converter 202 of FIG. 2A is exemplary only and other designs are possible. For example, inductance 260 of value "L" and output capacitance 270 of value "$C_{OUT}$" form a resonant circuit with resonant frequency $1/\sqrt{LC_{OUT}}$. If this resonant frequency falls at or near the modulation frequency, then it could interfere with communications. The output of DC converter 202 could be modified to dampen and reduce this resonance. FIG. 2B is a schematic diagram of an example modified DC converter with a dampened output resonance. DC converter 203 is a buck converter and comprises resistance 271 and capacitance 272 which dampen the resonance of inductance 260 and output capacitance 270.

Figure 3:
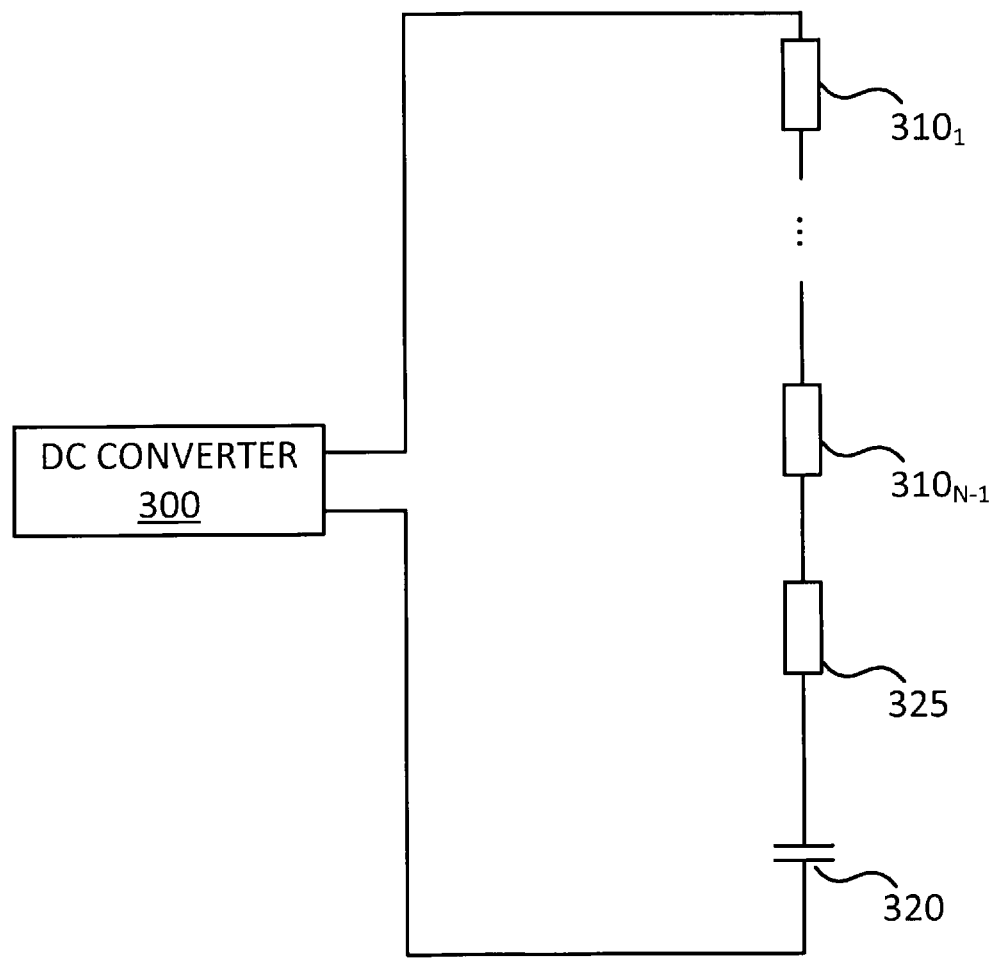
FIG. 3 is a schematic diagram of an equivalent circuit of a PV panel string.

A change in output voltage ($\Delta V$) of DC converter $110_1 \ldots 110_N$ of FIG. 1A creates a voltage change $V_{DIFF}$ across the other components serially connected to it in panel string 161. FIG. 3 is a schematic diagram of an equivalent circuit of PV panel string, such as PV panel string 161 of FIG. 1A. Transmitting DC converter 300 is serially connected to DC converter output impedances $310_1 \ldots 310_{N-1}$, communication gateway impedance 325 and string inverter input capacitance 320. DC converter output impedance $310_1 \ldots 310_{N-1}$ represent the output impedance of receiving DC converters $110_1 \ldots 110_{N-1}$ and could, in one embodiment be substantially the same value as the impedance of output capacitance 270 in FIG. 2A. In another embodiment output impedance $310_1 \ldots 310_{N-1}$ could be substantially the same value as the impedance of the series connection of capacitance 270 with the parallel connection resistance 271 and capacitance 272 of FIG. 2B. String inverter input capacitance 320 represents the input capacitance of string inverter 120 and is of value $C_{INV}$. Communication gateway impedance 325 represents the impedance of communication gateway 125. In one embodiment DC converter impedances $310_1 \ldots 310_{N-1}$ and communication gateway impedance 325 are substantially identical and of value $Z_{DC}$. In this embodiment the voltage change ($V_{DIFF}$) across an impedances $310_1 \ldots 310_{N-1}$ and 325 is given by the equation:

$$V_{DIFF} = \frac{\Delta V \times Z_{DC}}{NZ_{DC} + 1/j\omega C_{DC}}$$

If $NZ_{DC} \gg 1/j\omega C_{DC}$ the this simplifies to $$V_{DIFF} \cong \frac{\Delta V}{N}$$

The voltage signal appearing across communications gateway capacitance 325 and receiving DC converter capacitance $310_1 \ldots 310_{N-1}$ from transmitting DC converter 300 is therefore approximate 1/N th of the voltage change $\Delta V$. In one embodiment the change in voltage $V_{DIFF}$ is detected by a voltage sensor in any of receiving DC converters $110_1 \ldots 110_{N-1}$ or communications gateway 125. This voltage could be detected by, for example, referring to FIG. 2A, voltage sensor 243 of DC converter 202. In this embodiment no additional hardware is required for a DC converter to communicate with other components in its string.

In another embodiment the change in output current $\Delta I$ of the transmitting DC converter is sensed by receiving DC converters or the communications gateway. This current could be detected by, for example, referring to FIG. 2A, current sensor 242 of DC converter 202. In this embodiment no additional hardware is required for a DC converter to communicate with other components in its string.

In these examples, control variable modulation produces changes in power converter output voltage or current to transmit information. For embodiments in which power converter output voltage is used to transmit the information, reception of the transmitted information involves detecting changes in voltage or current or rates of change in voltage or current at another component that is coupled to the transmitting power converter. This other component could be another power converter or a communication gateway, for example. In a power converter output current embodiment, reception involves detecting changes in voltage or current or rates of change in voltage or current at another component that is coupled to the transmitting power converter.

A PV panel string could be a less than ideal communications medium since it is primarily designed to transmit large (~10 A) DC currents and not to transmit information. The impedance of a PV panel string could vary with frequency depending on the nature of any EMI (Electro Magnetic Interference) filtering which could be present at the output of each DC converter and also on the input characteristics of the string inverter. EMI filters could be applied to the output of a DC converter to filter out the DC converter's switching frequency and prevent it appearing on the grid. The operation of the string inverter could also produce interference, from, for example the operation of a string inverter MPP loop. In one embodiment the power converter control variable is modulated during communications at a modulation frequency that is below the corner frequency of the EMI filters which apply filtering to power converter outputs, and above the bandwidth of the string inverter's MPP loop. The corner frequency of the EMI filter is typically set significantly below the switching frequency of the DC converter. For example a DC converter with a switching frequency of 150 kHz might have an EMI corner frequency of 20 Hz. The string inverter MPP control loop frequency is typically a few Hz.

A robust communication method could therefore be beneficial in providing higher communication data rates and lower bit error rates.

In one embodiment control variable modulation is in accordance with a Direct Sequence Spread Spectrum (DSSS) communication method employing Barker encoding. A DSSS method produces a pseudo random sequence of code symbols called "chips" each of which has a shorter duration than the information bit. The chip communication rate is therefore higher than the information communication rate. DSSS spreads the communication over multiple frequencies and is therefore robust against interference from a single frequency.

A Barker code is particular digital sequence of ones and zeros and has the property that its off-peak autocorrelation coefficients are all less than or equal to one while its on-peak correlation coefficient is the length of the code. For example a seven digit Barker code would have an on-peak correlation coefficient of seven. The individual digital values in a Barker code are its "chips". For example, a seven digit Barker code comprises seven values of either "1" or "0". A single Barker code communicates a single bit of information. For example, in one embodiment the 7 "chip" Barker code "1110010" communicates a binary one and the inverse code "0001101" communicates a binary zero.

Figure 4:
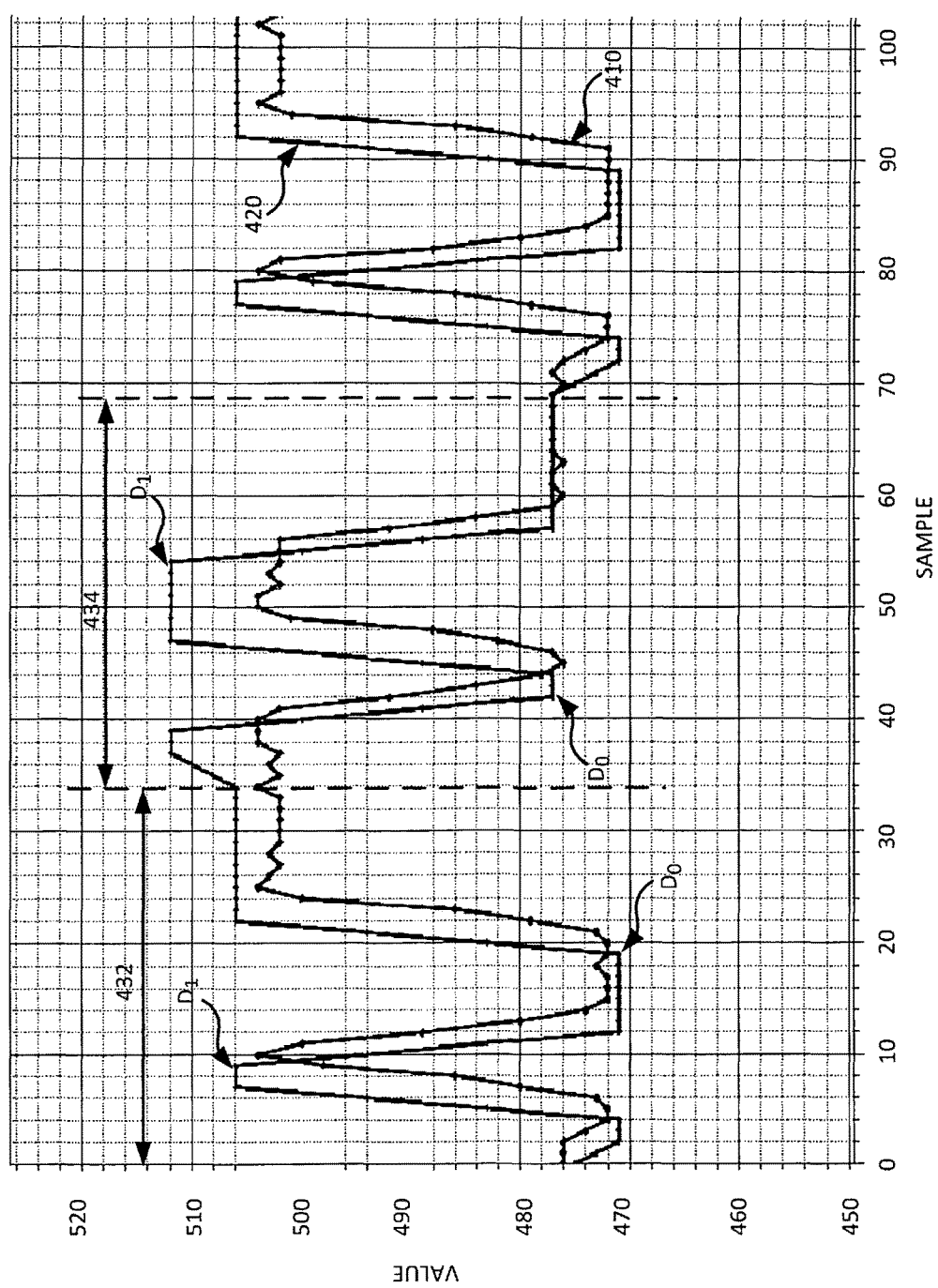
FIG. 4 is a graph showing an example of a sampled, Barker coded, nine bit Pulse Width Modulation (PWM) signal and a resulting voltage signal produced by a transmitting DC converter.

FIG. 4 is a graph showing an example of a sampled, Barker coded, nine bit PWM signal and a resulting voltage signal produced by a transmitting DC converter. Such signals could be produced by, for example, DC converter 202 of FIG. 2A. The horizontal axis represents the number of samples. The vertical axis represents PWM signal values. The PWM signal has a permissible range from 0 to 512. Line 420 represents time samples of a seven chip Barker coded PWM signal. The sampling frequency is 32 kHz and the chip frequency is 6.4 kHz. There are therefore five samples per chip. Since there are seven chips per bit of information the raw bit rate is 914 bits per second. Line 410 is a measurement of a transmitted voltage at the output of the DC converter and does not have an associated scale and is for illustrative purposes. 7-chip code 432 comprises the Barker code 1110010 and 7-chip code 434 comprises the Barker code 0001101. The Least Significant Bit of the Barker code is transmitted first and the Most Significant Bit of the Barker code is transmitted last.

Barker codes have unequal numbers of chip values of "1" s and "0". For example the seven digit code 1110010 has four "1" s and three "0" s and the seven digit code 00011010 has four zeros and three ones. This asymmetry could produce an undesirable DC offset in the average value of the DC converter output voltage and current from its MPP value. This asymmetry could be compensated for by selecting respective values of the power converter output voltage to transmit a chip "1" ($V_1$) and a chip "0" ($V_0$) based on the ratio of chip values "1" to chip values "0" in the code to be transmitted. In one embodiment the relation between $V_1$ and $V_0$ is given by the formula $$\frac{V_1 - V_M}{V_0 - V_M} = K_1 / K_0$$

Where $V_M$ is the median value of the output voltage cycle during communications, $K_1$ is the number of chip "1" s and $K_0$ is the number of chip "0" s. For example, for the Barker code 1110010 $K_1/K_0$ has a value of 4/3. For the Barker code 0001101 $K_1/K_0$ has a value of 3/4.

In another embodiment the relation between the control variable to transmit a chip "1" ($D_1$) and a chip zero ($D_0$) is given by the formula $$\frac{D_1 - D_M}{D_0 - D_M} = K_1 / K_0$$

Where $D_M$ is the median value of the control variable during communications. For example, in line 420 of FIG. 4 the values of $D_1$ and $D_0$ during time interval 432 when Barker code 1110010 is being transmitted differ from the values of $D_1$ and $D_0$ during time interval 434 when Barker code 0001101 is being transmitted.

Figure 5:
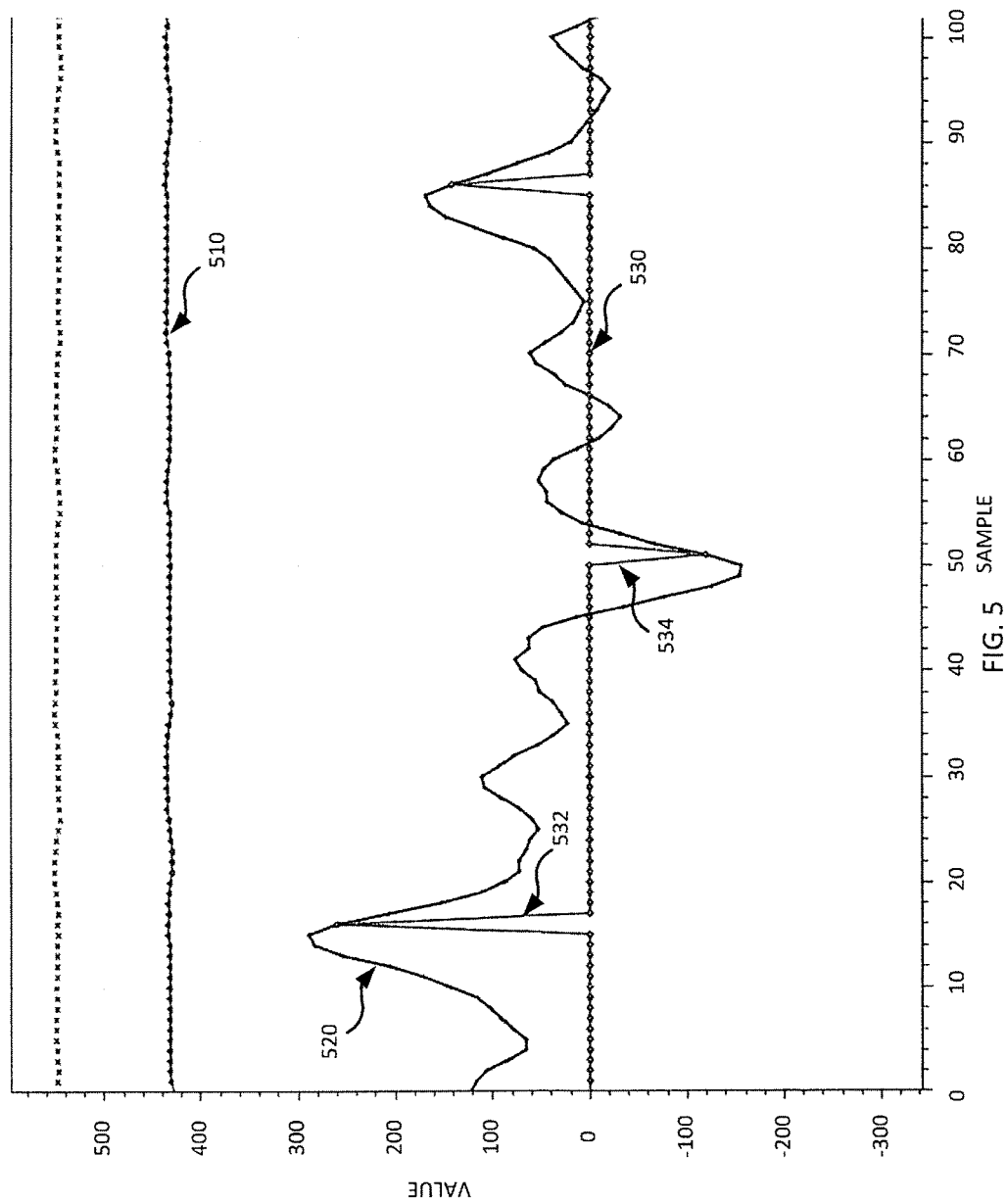
FIG. 5 is a graph showing an example autocorrelation signal calculated from an example received voltage signal and a resulting example bit declared signal.

FIG. 5 is a graph showing an example autocorrelation signal calculated from an example received voltage signal and a resulting example bit declared signal. Line 510 represents the received voltage signal. The received voltage signal might be received by any of DC converters $110_1$ ... $110_N$ or communication gateway 125 of FIG. 1A. The voltage signal might be measured by voltage sensor 243 of DC converter 202 of FIG. 2A, for example. Line 520 represents the auto correlation signal calculated from received voltage signal 510. The autocorrelation signal might be calculated by controller 212 of DC converter 202 of FIG. 2A, for example. Information could be extracted from the autocorrelation function by any of a variety of known signal processing techniques such as, for example, thresholding, peak detection and/or frequency locking. Line 530 represents a bit declared signal calculated from autocorrelation signal 520. A non-zero value represents a detected bit and the polarity of the signal indicates whether the detected bit is a "0" or a "1". Peak 532 represents declaration of a "1" and peak 534 represents declaration of a "0".

In one embodiment, a DSSS 7 bit Barker coded communication scheme is used with a duty cycle modulation to produce a 2.5% output voltage modulation resulting in a Bit Error Rate of <$10^{-4}$ at a transmission frequency of 6.4 kHz.

Communication methods other than DSSS using Barker codes are possible and could include Frequency Shift Keying (FSK) or Orthogonal Frequency Division Multiplexing (OFDM).

The above methods, although described primarily in the context of DC converters, can also or instead be applied to other types of power converters, such as DC/AC power converters, commonly referred to as inverters in the case of power converters that convert from DC to AC.

Figure 6:
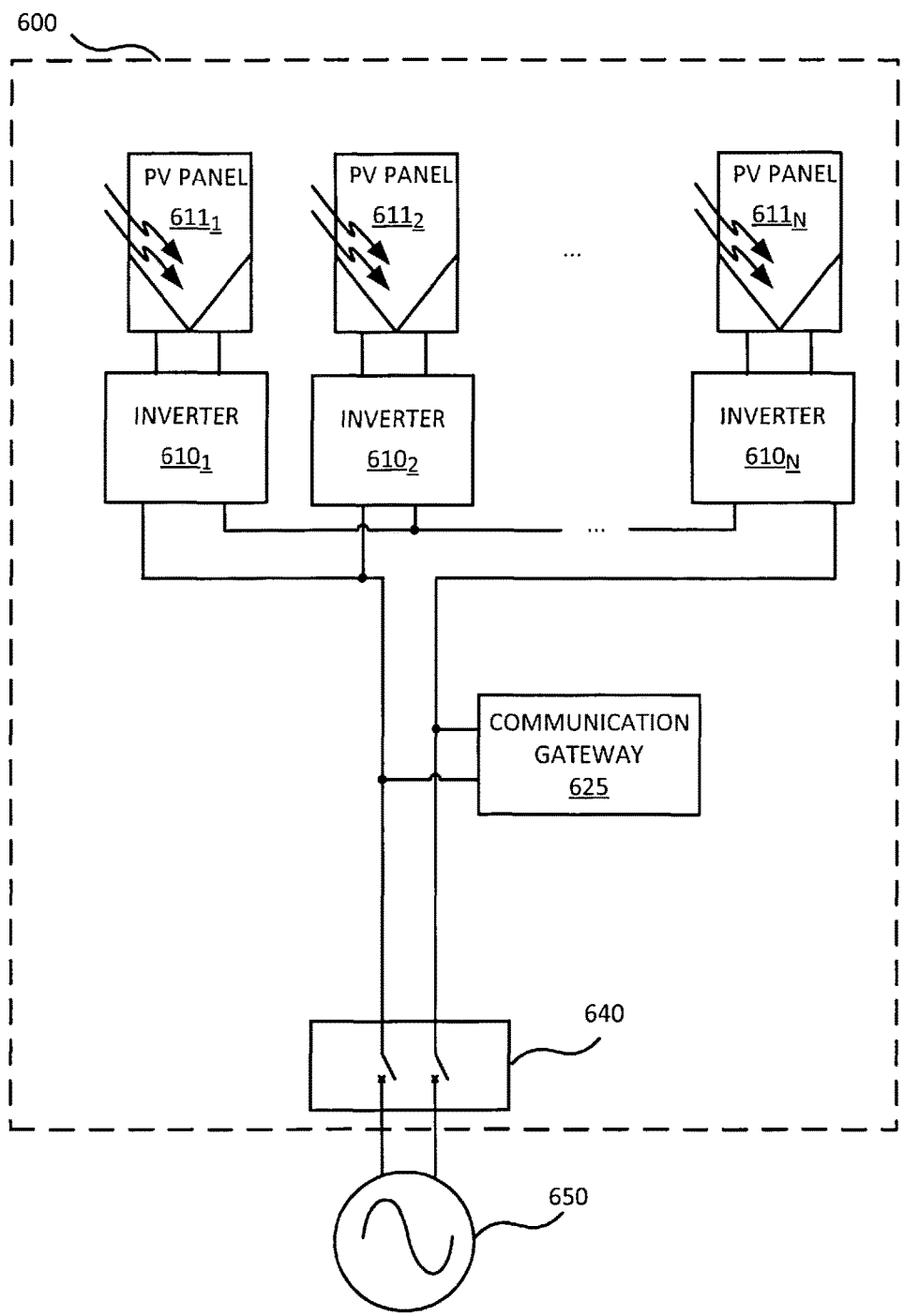
FIG. 6 is a block diagram of another example PV power system.

FIG. 6 is a block diagram of an example solar PV power system using parallel connected inverters. System 600 comprises PV panels $611_1$, $611_2$ ... $611_N$, inverters $610_1$, $610_2$ ... $610_N$, communication gateway 625 and grid disconnect switch 640. The inputs of inverters $610_1$, $610_2$ ... $610_N$ couple to PV panels $611_1$, $611_2$ ... $611_N$. The outputs of inverters $610_1$, $610_2$ ... $610_N$ are serially connected to the input of grid disconnect switch 640. Communication gateway 125 is parallel connected across each of inverters $610_1$, $610_2$ ... $610_N$. System 600 connects to electrical grid 650 at the output of grid disconnect switch 640. In one embodiment electrical grid 650 has a grid frequency of 60 Hz and an RMS grid voltage of 240V.

Communication gateway 125 receives communication signals from inverters $610_1$, $610_2$ ... $610_N$. In some embodiments communication gateway 625 also transmits communication signals to inverters $610_1$, $610_2$ ... $610_N$. In some embodiments communication gateway 125 communicates with a monitoring station (not shown).

Inverters $610_1$, $610_2$ ... $610_N$ convert the DC power of PV panels $611_1$, $611_2$ ... $611_N$ into AC power suitable for grid 650. Inverters $610_1$, $610_2$ ... $610_N$ could be switching mode power converters. The operation of a switching mode inverters is conceptually similar to the above described switching mode DC converters. The output voltage and current of a switching mode inverter depend on the duty cycle of its switches. The duty cycle of switching mode inverters is sinusoidally modulated at the grid frequency (e.g. 60 Hz) to produce a sinusoidally varying voltage and current at the grid frequency. Similar to the above discussed DC converters, inverters $610_1$, $610_2$ ... $610_N$ could provide valuable diagnostic information about the health of their respective PV panels. Similar to the above discussed DC converters, inverters $610_1$, $610_2$ ... $610_N$ could communicate information by modulating their duty cycle and output voltage. The communication modulation could be impressed over the sinusoidal modulation. It could be at a similar frequency to the previously described modulation for DC converter communication and below the corner frequency of any EMI filters. In this case, however, the lower bound on the communications frequency could be the control-bandwidth of the sinusoidal AC waveform generator and not the MPP control loop, but techniques are otherwise similar. Similarly, communication schemes such as Barker coded DSSS, OFDM or FSK could be used.

What has been described is merely illustrative of the application of principles of embodiments of the present disclosure. Other arrangements and methods can be implemented by those skilled in the art.

For example, at a system level, methods as disclosed herein could be implemented in a power system comprising multiple power converters coupled in a circuit path with a communication gateway, as shown in FIG. 1A. The determination of information to be transmitted and the modulation of the power converter control variable could be performed at each power converter. At the communication gateway, the following operations could be performed: detecting changes in voltage or current on the circuit path; and demodulating the information transmitted by the power converters based on the detected changes. The demodulating refers to extracting the information that was transmitted by the power converters, and examples of operations that could be involved in extracting the information are described above.

The presently disclosed methods could also or instead be implemented to enable power converters to communicate with each other, or to also or instead enable other components such as a communication gateway to communicate with the power converters. In this case, the detecting and demodulating operations could be performed at each of the power converters to enable each power converter to receive the transmitted information.

Figure 7:
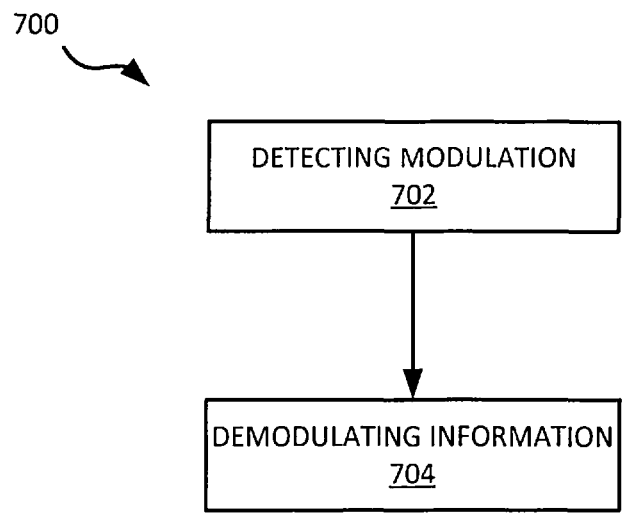
FIG. 7 is a flow diagram of an example reception method.

In a more general sense, a reception method includes detecting, by a sensor of a power converter, modulation of voltage or current on a circuit path that is coupled to the power converter, and demodulating, by a controller of the power converter, information from the circuit path voltage or current based on the detected modulation. FIG. 7 is a flow diagram of such a method. The example method 700 includes detecting modulation at 702 and demodulating information at 704.

Embodiments disclosed herein may enable power converter communications without requiring additional hardware. This is illustrated in further detail below with reference to FIG. 2A.

As shown, a power converter 202 includes controllable switch elements 220, 230 and a controller 212. The controller 212 is coupled to the controllable switch elements 220, 230, and is configured to control switching of the controllable switch elements in accordance with a control variable of the power converter; to determine information that is to be communicated by the power converter; and to modulate the control variable during communications, based on the determined information, to modulate an output of the power converter. Power converter communications can thereby be enabled using existing components of a power converter and configuring the controller 212 to modulate the power converter control variable.

Similarly, existing power converter components could be used in receiving transmitted information. A sensor 243, 242 is already provided in the power converter 202 to sense voltage or current on a circuit path to which the power converter is coupled, by its terminals 286, 288. The controller 212 is coupled to each sensor 242, 243, and could be configured not only to control operation of the power converter based on the sensed voltage or current, but also to detect modulation of voltage or current about a median value of voltage or current on the circuit path, and to demodulate information from the circuit path voltage or current based on the detected modulation about the median value.

Any divisions of function in the drawings are not intended to be limiting or exhaustive. Other embodiments could include additional, fewer, and/or different components than shown. Similarly, other method embodiments could include additional, fewer, and/or different operations performed in an order similar to or different from the orders shown in the drawings and described above.

Although the example method in FIG. 1B is shown as ending after certain operations are performed, methods could be repeated multiple times, to provide for ongoing communications. Communications could be started or invoked at different times for different power converters, to avoid or limit the likelihood of multiple power converters attempting to transmit at the same time. Each power converter could monitor for voltage or current modulation on a circuit path and start transmission of information after detecting its own identifier or an identifier of its connected PV panel, for example. In another possible embodiment, a randomized approach to transmission timing may decrease the likelihood that more than one power converter will start transmitting at any particular time.

The plots in FIGS. 4 and 5 are also intended as illustrative examples. Similar or different characteristics could be observed in simulation or operation of embodiments of the present disclosure.

Also, although described primarily in the context of methods and apparatus, other implementations are also contemplated, as instructions stored on a non-transitory computer-readable medium, for example.

What is claimed is:

1. A power converter communication method comprising:
   modulating a control variable of the power converter, to modulate an output of the power converter to communicate information,
   the modulating comprising modulating the control variable to assume binary values of either a first binary value or a second binary value during communications,
   the first binary value and the second binary value having a median value that is set to a value of the control variable immediately preceding communications.

2. A power converter communication method comprising:
   modulating a control variable of the power converter, to modulate an output of the power converter to communicate information,
   the modulating comprising modulating the control variable during communications at a modulation frequency below a corner frequency of EMI (Electro Magnetic Interference) filtering applied to an output of the power converter.

3. The method of claim 2,
   the modulating further comprising modulating the control variable to assume any of at least a first value and a second value during communications.

4. The method of claim 2,
   the modulating further comprising modulating the control variable to assume binary values of either a first binary value or a second binary value during communications.

5. The method of claim 4, the first binary value and the second binary value having a median value that is set to a value of the control variable immediately preceding communications.

6. The method of claim 2, the control variable comprising a duty cycle D of switching in the power converter.

7. The method of claim 2, the modulating further comprising modulating the control variable to produce binary values $V_1$, $V_0$ of power converter output voltage or binary values $I_1$, $I_0$ of power converter output current during communications, in accordance with a closed loop control method.

8. The method of claim 7,
   the modulating further comprising modulating the control variable to produce the binary values $V_1$, $V_0$, of power converter output voltage,
   a mid-point voltage $(V_1+V_0)/2$ being set to an average value of the power converter output voltage immediately preceding communications.

9. The method of claim 7,
   the modulating further comprising modulating the control variable to produce the binary values $V_1$, $V_0$, of power converter output voltage,
   the control variable comprising a duty cycle D of switching in the power converter,
   a higher of the binary values $V_1$, $V_0$ of power converter output voltage being set to correspond a duty cycle D of 100%.

10. The method of claim 2,
    the power converter being controlled in accordance with a Maximum Power Point (MPP) control loop to maintain a PhotoVoltaic (PV) panel that is coupled to the power converter at its MPP,
    the modulating comprising modulating the control variable during communications at a modulation frequency greater than a bandwidth of the MPP control loop.

11. The method of claim 2,
    the power converter being controlled in accordance with a Maximum Power Point (MPP) control loop to maintain a PhotoVoltaic (PV) panel that is coupled to the power converter at its MPP,
    the method further comprising:
    suspending the MPP control loop during communications.

12. The method of claim 2,
    the modulating further comprising modulating the control variable to produce changes in power converter output voltage,
    the method further comprising:
    detecting changes in voltage at a component that is operatively coupled to the power converter.

13. The method of claim 2,
    the modulating further comprising modulating the control variable to produce changes in power converter output current,
    the method further comprising:
    detecting changes in current at a component that is operatively coupled to the power converter.

14. The method of claim 2,
    the modulating comprising modulating the control variable in accordance with a Direct Sequence Spread Spectrum (DSSS) communication method employing Barker encoding.

15. The method of claim 14,
    the Barker encoding comprising codes with unequal numbers of chip values for "1" and "0",
    the modulating further comprising selecting respective values of power converter output voltage to transmit a chip "1" and a chip "0" based on a ratio of chip values "1" to chip values "0" in a code to be transmitted.

16. The method of claim 2,
    the modulating further comprising modulating the control variable during communications at a modulation frequency below a switching frequency of the power converter.

17. The method of claim 2, the power converter comprising a Direct Current (DC) power converter.

18. The method of claim 2, the power converter comprising a Direct Current/Alternating Current (DC/AC) power converter.

19. The method of claim 2, implemented in a power system comprising a plurality of power converters coupled in a circuit path with a communication gateway,
    the method comprising, at each of the power converters, the modulating,
    the method further comprising, at the communication gateway:
    detecting changes in voltage or current on the circuit path;
    demodulating the information communicated by the power converters based on the detected changes.

20. The method of claim 2, implemented in a power system comprising a plurality of power converters coupled in a circuit path,
    the method comprising, at each of the power converters:
    the modulating;
    detecting changes in voltage or current on the circuit path;
    demodulating the information communicated by other power converters based on the detected changes.

21. The method of claim 2, implemented in a power system comprising the power converter and a communication gateway, the method further comprising:
    detecting, by the communication gateway, modulation of voltage or current on a circuit path coupling the power converter and the communication gateway;
    demodulating, by the communication gateway, the information from the circuit path voltage or current based on the detected modulation.

22. A power converter comprising:
controllable switch elements;
a controller, coupled to the controllable switch elements, to control switching of the controllable switch elements in accordance with a control variable of the power converter; and to modulate the control variable during communications to modulate an output of the power converter to communicate information,
the controller being configured to modulate the control variable during communications at a modulation frequency below a corner frequency of EMI (Electro Magnetic Interference) filtering applied to an output of the power converter.

23. The power converter of claim 22, further comprising:
a sensor to sense voltage or current on a circuit path to which the power converter is coupled;
wherein the controller is coupled to the sensor, to control operation of the power converter based on the sensed voltage or current, to detect modulation of voltage or current on the circuit path, and to demodulate information from the circuit path voltage or current based on the detected modulation.

\* \* \* \* \*